Jan. 2, 1951  G. PASCOE ET AL  2,536,566
DYNAMIC BALANCING MACHINE
Filed July 7, 1945  4 Sheets-Sheet 1

*George Pascoe*
*David Doig*
INVENTORS

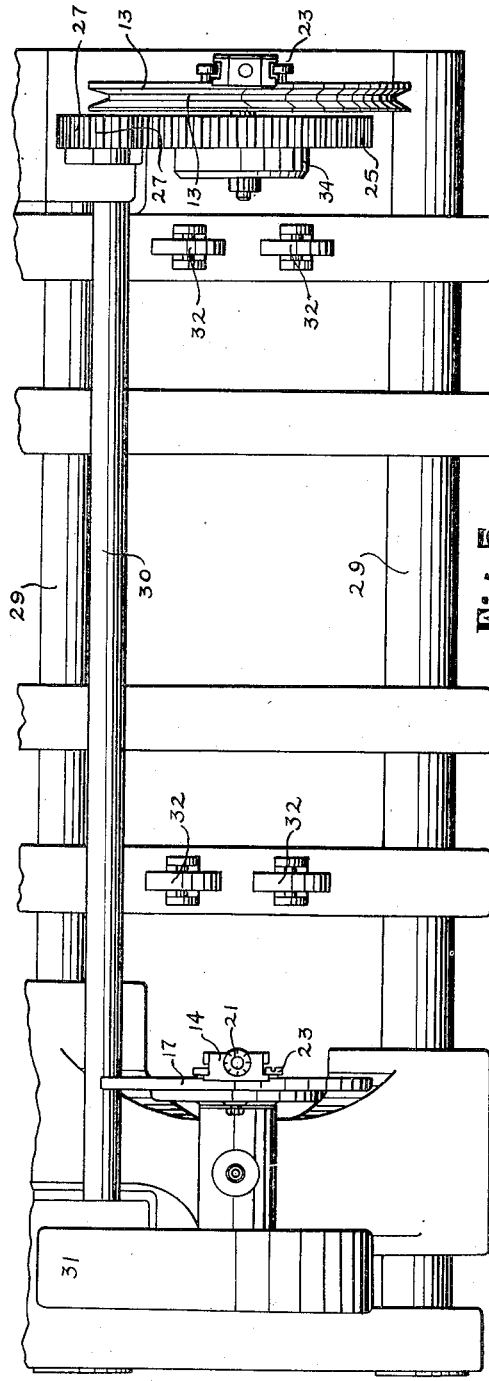
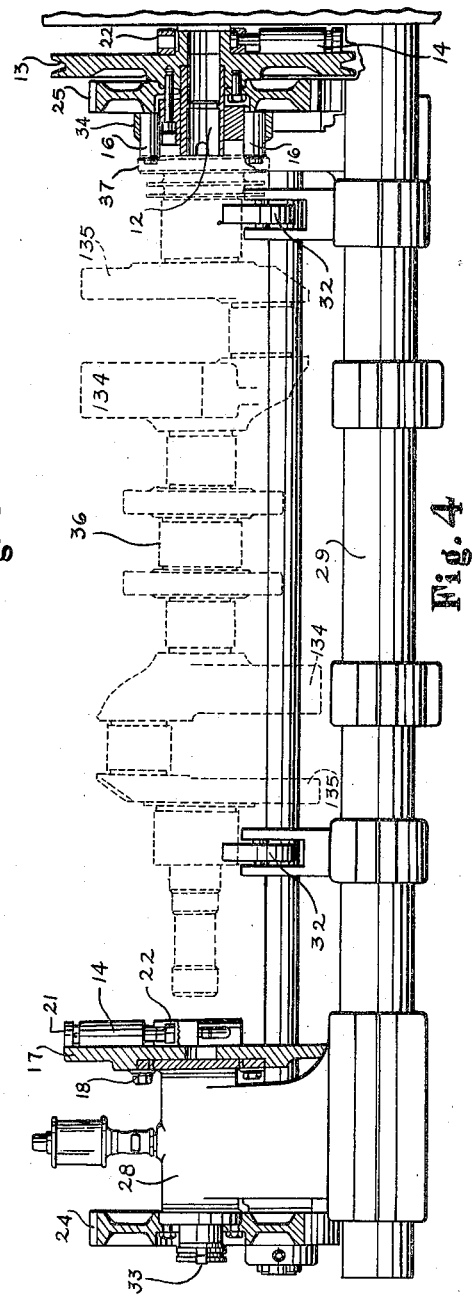

Jan. 2, 1951  G. PASCOE ET AL  2,536,566
DYNAMIC BALANCING MACHINE

Filed July 7, 1945  4 Sheets-Sheet 3

George Pascoe
David Doig
INVENTORS

BY *Edwin C. McRae*
*R. C. Faris*
Attorneys

Jan. 2, 1951   G. PASCOE ET AL   2,536,566
DYNAMIC BALANCING MACHINE
Filed July 7, 1945   4 Sheets-Sheet 4

George Pascoe
David Doig
INVENTORS

BY Edwin C. McRae
R. C. Harris
Attorneys.

Patented Jan. 2, 1951

2,536,566

UNITED STATES PATENT OFFICE 2,536,566

DYNAMIC BALANCING MACHINE

George Pascoe and David Doig, Detroit, Mich., assignors to Ford Motor Company, Dearborn, Mich., a corporation of Delaware Application July 7, 1945, Serial No. 603,710

3 Claims. (Cl. 73—66)

This invention relates to balancing machinery; and, more particularly, to machines used for the dynamic balancing of crankshafts and other similar rotative objects which require, during the balancing process, the substitution and addition of demountable weights to simulate the reciprocating weight and resultant added centrifugal force which is placed on the throws of the crankshaft or other rotating objects by the reciprocating parts which are attached thereto during actual use.

It is an object of this invention to provide a dynamic balancing machine which is equipped with "built-in," adjustable counterweights that will rotate in synchronism with the crankshaft or article being balanced, so as to create the same moment of couple as results from the use of demountable bobweights which, heretofore, have been attached to the object being balanced and removed after such balancing was achieved.

A second object of this invention is to provide a dynamic balancing method which will permit the dynamic balancing of the primary forces exerted upon a crankshaft or other rotative object without the use of demountable bobweights attached to the shaft during the balancing process.

A further object of our invention is to provide a balancing machine with adjustable "built-in" counterweights, so that both the machine and the position of the counterweights may be adjusted so as to accommodate crankshafts and other rotative objects of various sizes and weights.

Balancing machines, designed to reveal the location and amount of dynamic unbalance in crankshafts, flywheels and other rotating objects are well-known and widely used in the art at the present time. These machines, however, are primarily intended for the balancing of rotative objects whose dynamic balance can be checked and corrected without the addition or substitution of auxiliary weights during the balancing process. However, in the balancing of some rotative objects—particularly crankshafts having four throws spaced 90° apart—allowance must be made for the weight and centrifugal force which is generated by the large ends of the connecting rods which are comprised of the bearings, bearing caps and studs which secure the connecting rods to the crank throws, and for a portion of the weight of the reciprocating parts such as the pistons, wrist pins, piston rings and the small ends of the connecting rods.

In the present art, the weight for which allowance must be made is simulated by attaching temporary weights to the shaft during the balancing period. This weight, proportionate to that of the parts enumerated above, is represented by a proper number of bobweights (four in the case of the 90° crankshaft), which are attached to the throws of the shaft. Because of the high degree of accuracy which must be maintained during the balancing period, the bobweights must be precisely machined and attached with great care to the carefully ground throws of the shaft. The need for such accuracy in the balancing procedure is obvious when it is remembered that the centrifugal force exerted by one ounce, at a radius of one inch from an axis, produces a force of 256 ounces when the rotative speed about the axis is 3,000 revolutions per minute—an operating speed of internal-combustion engines.

High-volume production methods require that hundreds of crankshafts be tested for dynamic balance each day and it is obvious, therefore, that great numbers of accurate bobweights must be prepared, stored and maintained in perfect condition for immediate use. The problem of different size bobweights is presented if production of crankshafts of different weights or lengths is being maintained at the same time and in the same plant. The problem of employing bobweights is made greater by the fact that to achieve a high standard of dynamic balance, it is sometimes necessary, during the balancing procedure, to attach bobweights of one weight to the inner throws of the shaft, and those of another weight to the outer throws. This further increases the number of different bobweights that must be on hand and creates the risk that those of the wrong weight will be used.

It is apparent, too, that the use of bobweights, in balancing crankshafts increases not only the equipment cost, but also the number of man-hours required for the preparation of an engine under mass-production methods. With an ample supply of bobweights and trained personnel, it was found that the time spent in attaching and removing bobweights, and in the conveying of the shaft to and from the benches where these operations were performed, was greater than the total time consumed in the actual balancing operation. Ease of handling crankshafts during the testing or balancing period must also be considered, and it is of interest that attaching the bobweights increases the weight of the average 90° crankshaft by from 12 to 13 pounds. Although crankshafts of this type range in weight from 65 to 71 pounds without the bobweights, they are generally placed on and removed from conveyors and testing machines by hand; increasing the average weight from 70 to 83 pounds, therefore, is of prime importance from the standpoint of workman's speed, efficiency, and safety.

As is demonstrated by the drawings presented and discussed hereinafter, no means is provided in the instant invention for driving or rotating the improved balancing machine; nor is any means provided for registering the location of the point or points of dynamic unbalance in the object being treated in the machine. Such drive and register means are well-known in the present art, and are not concerned within the scope of this invention.

The instant invention is, therefore, primarily intended for application to any dynamic balancing operation wherein extraneous and temporary weight must be attached to the object being balanced to stimulate the forces generated by the reciprocating parts which will be later attached to such revolving parts.

With these and other objects in view, the invention consists in the arrangement, construction and combination of the various parts of our improved device, as described in the specification, claimed in the claims, and as illustrated in the accompanying drawings, in which:

Figure 4 is an elevation drawing of the improved balancing unit with a crankshaft 36 depicted in phantom in the machine and with the headstock and tailstock sections cut away.

Figure 5 is a plan view of the improved machine.

Figure 1:
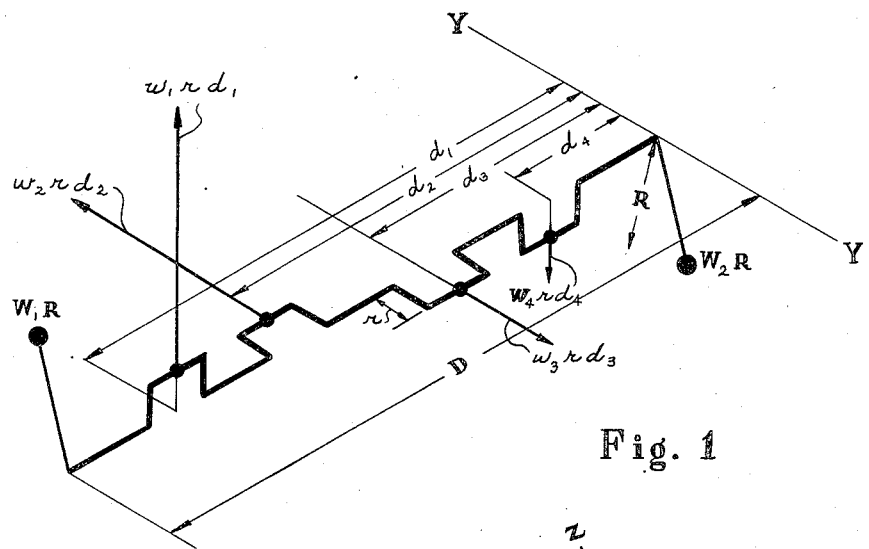
Figure 1 is a schematic perspective drawing, depicting the forces exerted upon a 90° crankshaft with bobweights attached to the crank throws, and the respective moments of couple of the individual bobweights.

Referring now to Figure 1, the symbol $w_1r_1d_1$ represents the moment of couple of a bobweight attached to crank throw #1. Here, $w$ represents the weight of the bobweight, $r$ represents the radial distance of the bobweight as it revolves around the axial center of the crankshaft, from such center, and $d_1$ represents the distance of the bobweight from the arbitrarily established constant plane Y—Y. Similar symbols are developed and shown for the bobweights located on crank throws 2, 3 and 4.

Figures 2, 3:
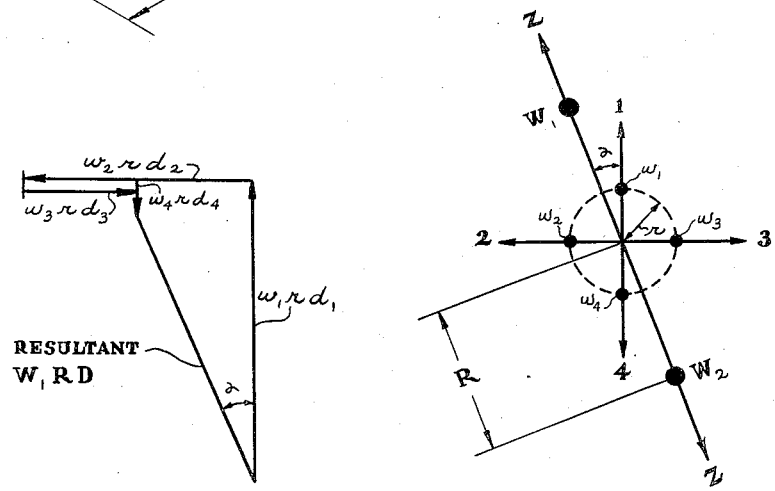
Figure 2 is a force diagram showing the relative forces and positions of the four bobweights which are attached to the throws of a 90° crankshaft, plus the angle of application alpha along plane (Z—Z) and the radial distances from a center point of two counterweights needed to simulate the forces exerted by the bobweights.
Figure 3 is a moment of couple diagram of the bobweights and counterweights. Such moments of couple being based on Figures 1 and 2; the "resultant" $W_1RD$ shown in Figure 3 determines the correct position and value of the built-in counterweights in the improved machine.

In Figure 2, a force diagram, vectors 1, 2, 3 and 4 represent the respective positions of bobweights 1, 2, 3 and 4 and their respective moments. Shown also is the angle of location (alpha) and the distance radially from the center point (R) of two counterweights which, when revolving with synchronous motion at angle alpha with relation to the number one crank throw, will create the same moment of couple as the four bobweights combined. Plotting the moments of the various bobweights and their respective distances from the arbitrarily established constant plane Y—Y, as developed in Figure 1, and basing their direction of force on Figure 2, Figure 3 presents the resultant $W_1RD$ at angle alpha representing the moment of couple and the angle of application of a counterweight which will produce a moment of couple equivalent to that of the four bobweights combined. It is obvious from the diagram in Figure 2, that the weight of the counterweight will vary inversely as the distance R; therefore, the weight of the counterweight will decrease as it is moved along angle alpha on line Z—Z, and as the distance R, or the distance of the counterweight from the axial center of the crankshaft, is increased. This fact permits the application of the principle here used to objects of any length or radial size and it logically follows, therefore, that the range of accommodation of any one machine would be markedly increased by providing for the variance of the value of the counterweights, their distances radially and longitudinally from the respective center points, and the angle at which the weights are located. It should be noted that it is our intention in the instant invention to provide for all the necessary adjustments outlined above.

When the position and size of the counterweights are considered, it is to be remembered that once located in accordance with the requirements of a certain shaft, the counterweights must remain in that position fixed with relation to one another and to the object being balanced, and must rotate in synchronism with that object.

Figure 7:
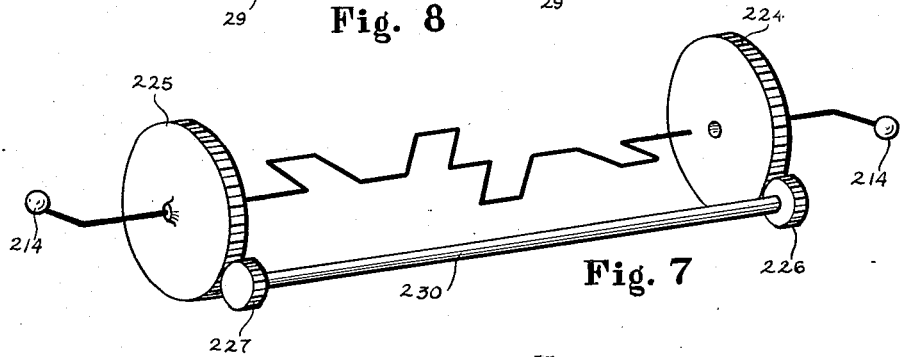
Figure 7 is a schematic drawing setting forth the basic mechanics of the invention.

To portray an application and a reduction to mechanical means of the mathematical fundamentals upon which this invention is based, reference is here made to Figure 7. This figure represents a 90° crankshaft suspended between a rotating headstock and drive gear 225, and a tailstock and drive gear 224, which are joined by pinion gears 226 and 227 and pinion shaft 230, so as to rotate synchronously with one another. Attention is also called to the counterweights 214 which, in order to produce a moment of couple sufficient to permit the balancing of the primary forces of the crankshaft, must rotate in synchronism with such crankshaft and maintain a fixed position relative to it. As is shown in this figure — although the counterweights revolve about an axis common to the crankshaft — these counterweights are positioned obliquely to the throws of the crankshaft and their angular and radial position is determined by the data developed in Figures 1, 2, and 3.

Figure 4 depicts, in elevation, the improved portion of the balancing machine. It is to be remembered that this portion of the machine holds and revolves the crankshaft or other object being balanced and it is to this portion of the machine that this invention pertains. However, attention is called to the fact that in the more commonly used balancing machines, the holding and revolving means is mounted on a pivoted or suspended base or stand such as will vibrate and be caused to vibrate uniformly by the turning of the unbalanced shaft or object being balanced, and in synchrony with such vibrations. These vibrations are registered and measured through a series of electrical contacts and the results, as shown by a registering means, are used to make proper compensation in the weight of the shaft or other rotative object so that dynamic balance can be achieved.

To facilitate explanation and understanding of the present invention and its application to dynamic balancing, reference is made to the modern practice of forming crankshafts with an excess of metal disposed adjacent to certain predetermined crank throws of the shaft. This excess metal, in the form of "cheeks" or counterbalances is placed on the shaft to aid in the reduction of vibration and is in sufficient quantity to permit the removal of some metal in the achievement of dynamic balance.

In Figure 4 of the accompanying drawings, reference numbers 134 and 135 denote the "cheeks" or counterbalances from which said excess metal may be removed. As indicated here, the cheeks are of different thicknesses and, in the case of the 90° crankshaft portrayed, are located adjacent to the end throws. Number 134 will be hereinafter known as the "thick" cheek, and #135 as the "thin" cheek.

Dynamic balancing machines in common use today include two general types; one suspends the crankshaft from a point or points of suspension outside of the longitudinal plane of the object and rotates said object while so suspended. Vibrations set up by the unbalanced object during its rotation are used in determining the amount of excess material which must be removed from the "cheeks" to achieve the desired balance. The second general type rotates the crankshaft in a fixture whose base rests on pivot points located directly below the crankshaft in a predetermined plane. The oscillations of the crankshaft as it is rotated on the pivoted stand are here also used to compute the amount of excess metal which must be removed from the "cheeks" of the shaft.

Using the second-named type of machine as an example, the balancing method with the present invention comprises rotating the crankshaft with the supporting base pivoted on a point located directly in line with the plane from which the excess material is to be removed. The first step entails locating the pivot point in the same plane as the center of one of the thick cheeks 134, and in the same plane as the axis of the crankshaft, rotating the shaft in synchrony with the "built-in" counterweights and registering the amount of vibration. The point of pivot is then moved to a similar position with relation to the second thick cheek and the process is repeated. Computations are made from the amount of vibration registered during each step, and as directed by such computations a quantity of excess metal is removed from each of the two thick cheeks. The crankshaft is then returned to the machine and the process is repeated; this time, however, the pivot points are successively located in the same planes as the thin cheeks 135 and the excess metal is removed from those cheeks to bring about the condition of exact dynamic balance.

In each of the steps described, the crankshaft is rotated in synchrony with the built-in counterweights with no adjustments being made to the counterweights; in each operation, each counterweight generates a moment of couple equivalent to $W_1RD$ and $W_2RD$, respectively, as shown in accompanying Figure 3.

Specific attention is called to the fact that although only the two general types of dynamic balancing machine supporting means have been referred to here, and although the present application deals in detail with but one of these types, it is not the intention of the applicants that the instant invention shall be regarded as having application solely to the types enumerated. It is the applicants' belief that this invention has application to any balancing machine or dynamic balancing operation where it is necessary to simulate actual operating forces by the addition of extraneous, temporary weights to the object being balanced during the balancing period.

In Figure 4, power from some conventional means applied to drive pulley 13, is transmitted to drive shaft 12, causing the headstock assembly, comprised of drive gear 25, flange 34, two drive pins 16, a retaining collar 22, and a counterweight 14, to revolve axially as a unit. As is shown in Figure 5, drive gear 25 engages pinion gear 27 and, as the headstock assembly revolves, such motion is transmitted through pinion gear 27, then through pinion drive shaft 30, to a pinion gear similar to 27, but which engages tailstock drive gear 24 which, through tailstock shaft 33, results in a rotary motion of tailstock flange 17, synchronous with that of the headstock assembly.

Figure 6:
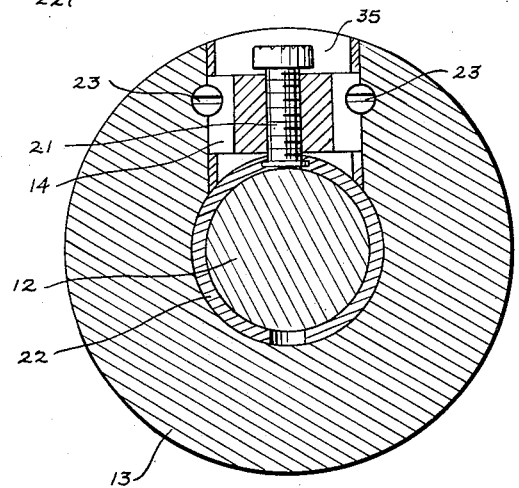
Figure 6 is a cross section taken through the tailstock assembly of Figure 4, and depicts the manner in which the counterweights are attached so as to be radially adjustable.

Adjustably affixed to the drive pulley 13 and tailstock flange 17, respectively, are counterweights 14 which, as is portrayed in Figure 6, may be adjusted radially by loosening the studs 23 (Figure 5) and turning calibrated adjustment screws 21. Screw 21 is retained with relation to the drive shaft 12 and flange 13 by retaining collar 22, which permits the screw to be turned. With the stud 23 loosened, a rotary motion applied to the head of adjustment screw 21 results in a radial sliding motion of the counterweight 14 on the flanges 13 or 17 with relation to the center point of the shafts 12 or 33, respectively. It is necessary in the proper operation of the machine for the counterweight 14 to remain fixed in position once the correct distance from the center point of shafts 12 and 33 is determined by the formula developed in Figures 1, 2, and 3; although adjustable radially, the counterweights 14 are restrained angularly by recesses in the flanges 13 and 17, in which the counterweights are held by studs 23, as shown in Figure 6. It is well to note that without the counterweights, the headstock unit and the tailstock unit are in both static and dynamic balance and that any unbalance in the mechanism during operation is supplied by either the counterweights or the unbalanced object being processed.

Figure 8:
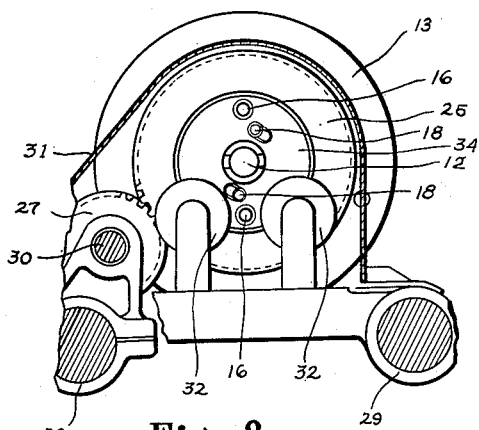
Figure 8 is an elevation of the headstock assembly, showing the drive pins and the adjustment studs, the latter used for the angular adjustment of the pulley to which the counterweight is attached, with relation to the headstock shaft.

Figure 4, reflects in phantom, the manner in which a crankshaft 36 is supported for rotation in the improved machine. The shaft or other part to be balanced rests in a cradle of four bearing rollers 32, which are slidably adjustable on parallels 29, so as to accommodate shafts or work of various sizes. When in proper position, supported by the bearing rollers, the flange 37 on the flywheel end of the crankshaft rests against headstock flange 34, so that headstock drive pins 16 fit into the assembly holes on the crankshaft flange 37, which holes are used for affixing the crankshaft to the flywheel. It is the custom in the art to drill such holes in the crankshaft flywheel flange in a definite pattern with relation to the throws of the shaft. This practice makes convenient the mounting of the crankshaft in the balancing machine, and insures the proper radial and peripheral relationship between the throws of the crankshaft and the counterweights of the balancing machine. However, in the event of an alteration in design changing such relationship, the drive studs 16 may be adjusted peripherally with relation to the headstock counterweight by loosening studs 18 and, as shown in Figure 8, and by rotating headstock flange 34 which is pierced by slotted holes and studs 18. This adjustment also effects a change in the degree of angularity which exists between the two counterweights and, therefore, a similar slotted hole arrangement is provided in tailstock flange 17, so that the tailstock counterweight can also be adjusted angularly with such flange.

Figure 11:
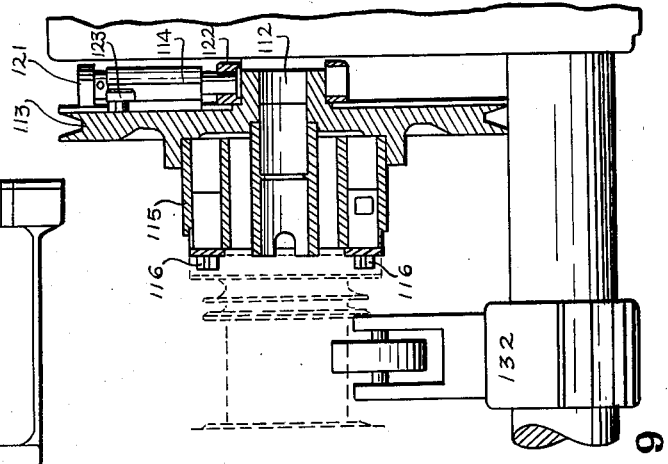
Figure 11 is a plan view of the drive yoke 119.
Figure 10:
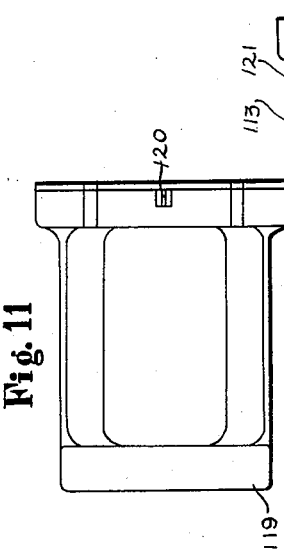
Figure 10 is an elevation of the drive yoke 119, into which the end of a crankshaft is inserted during the dynamic balancing process.
Figure 9:
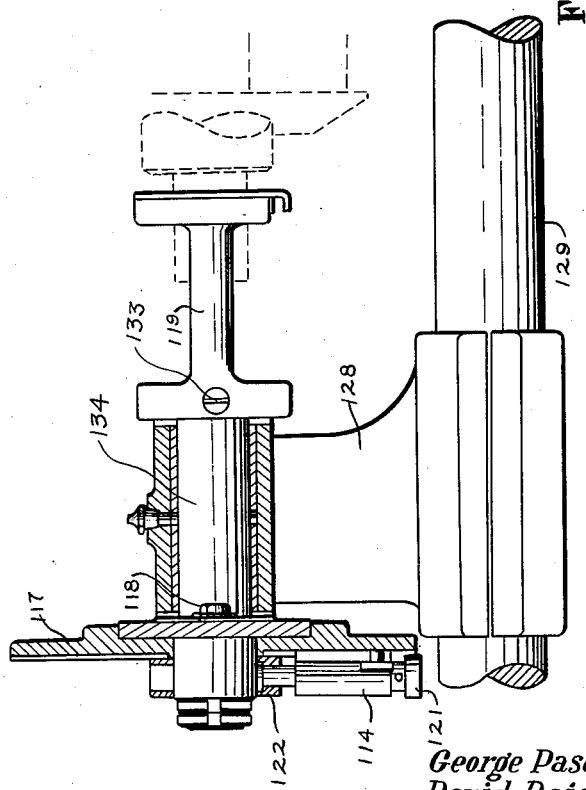
Figure 9 is an elevation of the balancing machine employing the use of "built-in" adjustable counterweights, but employing the crankshaft or object being dynamically balanced to transfer synchronous motion to the tailstock flange 117.

Figure 9 is an elevation of a dynamic balancing machine which embodies the instant invention and which provides for the synchronous motion of the head and tailstock counterweights by allowing the crankshaft, or piece being balanced, to insert in yoke 119, so that as rotary motion is applied to flange 113, the crankshaft is revolved by drive studs 116 and, in turn, transmits such motion to yoke 119, tailstock flange 117, and tailstock counterweight 114. As shown in Figure 10, an end view of yoke 119 and in Figure 11, a plan view of yoke 119, the tailstock yoke drive pin 120 is made an integral part of the yoke, so as to protrude into the arc of the yoke and at the center of the closed portion thereof. It is the common practice in the art to cut a keyway in the forward end of the conventional crankshaft to which keyway is fastened drive pulleys, timing gears, etc., upon final assembly. In mass-production methods, this keyway is cut in a definite position with respect to No. 1 crank throw, and the holes in the flywheel flange. Therefore, the keyway is in a set position in any one type of crankshaft and it may be used to engage tailstock yoke drive pin 120, to impart synchronous motion to flange 117, and tailstock counterweight 114, and to maintain these units in a definite position with relation to the headstock flange and counterweight.

In Figure 9, using tailstock yoke 119, the crankshaft rests upon four bearings, one of which is shown 132, with the holes in the crankshaft flange engaging drive studs 116, and with the forward end of the shaft resting in yoke 119, with pin 120 engaging the keyway of the shaft.

The use of yoke 119, as a method of transmitting rotary motion to the tailstock flange assembly, permits the improved machine to be adjusted to accommodate shafts of various lengths. The longitudinal distance between the headstock and tailstock may be varied by moving tailstock pedestal 128 along parallel support 129 to which it is slidably affixed. Slight variations in the position of the keyway, with respect to the crank throws or the holes in the flywheel flange, may be compensated for by peripheral and radial adjustment of counterweight 114, as explained hereinbefore. Further adjustment of the yoke 119 with relation to the drive pins and counterweights may be made by loosening set screw 133 and revolving the yoke around shaft 134.

The versatility and range of accommodation of the improved machine may be broadened by the use of sets of replaceable counterweights. These sets of weights—of dimensions proper to coincide with the recess 35 in which they rest and with adjustment screw 21—may be of metals of different specific gravities and weights and, therefore, may be used as the required value of such counterweight changes with the characteristics of the objects to be balanced.

Some changes may be made in the arrangement, construction and combination of the various parts of the improved device without departing from the spirit of the invention, and it is the intention to cover by the claims such changes as may be reasonably included within the scope thereof.

The invention claimed is:

1. A dynamic balancing machine for dynamically balancing crankshafts comprising a vibratably mounted base, first means mounted on said base and adapted to receive one end of a crankshaft and to impart thereto rotary motion about the axial center of said crankshaft, second means mounted on said base and arranged to rotate coaxially with said first means and arranged to be adjacent the other end of said crankshaft, a mass secured to said first mentioned means and a like mass secured to the second mentioned means and angularly spaced 180 degrees from the first mass, the weight, angular position, and radial position of said masses with respect to the crankshaft being selected so that there is produced a couple equal to that produced by attachments to be made in service, said first and second means being arranged to rotate in use with the crankshaft at the same speed and at a fixed and unvarying angular relationship.

2. A dynamic balancing machine for dynamically balancing crankshafts comprising a vibratably mounted base, first means mounted on said base and adapted to receive one end of a crankshaft and to impart thereto rotary motion about the axial center of said crankshaft, second means mounted on said base and arranged to rotate coaxially with said first means and arranged to be adjacent the other end of said crankshaft, a mass secured to said first mentioned means and a like mass secured to the second mentioned means and angularly spaced 180 degrees from the first mass, the weight, angular position and radial position of said masses with respect to the crankshaft being selected so that there is produced a couple equal to that produced by attachments to be made in service, and gearing means mechanically connecting said first and second means to rotate said second means with the crankshaft at the same speed and at a fixed and unvarying angular relationship.

3. A dynamic balancing machine for dynamically balancing crankshafts comprising first means adapted to receive one end of a crankshaft and to impart thereto rotary motion about the axial center of said crankshaft, second means arranged to rotate coaxially with said first means and arranged to receive the other end of said crankshaft, a mass secured to said first mentioned means and a like mass secured to the second mentioned means and angularly spaced 180 degrees from the first mass, the weight, angular position and radial position of said masses with respect to the crankshaft being selected so that there is produced a couple equal to that produced by attachments to be made in service, said first and second means being arranged to be mechanically connected together through the crankshaft to be balanced and hence to rotate in use with the crankshaft at the same speed and at a fixed and unvarying angular relationship.

GEORGE PASCOE.
DAVID DOIG.

REFERENCES CITED

The following references are of record in the file of this patent:

UNITED STATES PATENTS

| Number | Name | Date |
|---|---|---|
| 1,364,993 | Johnson | Jan. 11, 1921 |
| 1,515,034 | Griswold | Nov. 11, 1924 |
| 1,524,323 | Thomas | Jan. 27, 1925 |
| 1,731,833 | Van DeGrift | Oct. 15, 1929 |
| 2,314,287 | Pope | Mar. 16, 1943 |

FOREIGN PATENTS

| Number | Country | Date |
|---|---|---|
| 186,367 | Great Britain | Sept. 22, 1922 |